United States Patent [19]

Friedman

[11] Patent Number: 5,038,600
[45] Date of Patent: Aug. 13, 1991

[54] GAGE AND METHOD FOR MEASURING THE X-DIMENSION OF HYDRAULIC TUBE FITTINGS

[75] Inventor: Peter M. Friedman, Marina del Rey, Calif.

[73] Assignee: Military Standards Corporation, Marina del Rey, Calif.

[21] Appl. No.: 437,999

[22] Filed: Nov. 20, 1989

[51] Int. Cl.⁵ .............................................. G01B 5/12
[52] U.S. Cl. ...................................... 73/1 J; 33/502; 33/529; 33/544
[58] Field of Search .................... 73/1 J; 33/544, 502, 33/529, 542, 543.1, 544.1, 544.2, 544.3, 544.4, 542.1, 545, 549; 137/15

[56] References Cited

U.S. PATENT DOCUMENTS

| | | | |
|---|---|---|---|
| 1,459,896 | 6/1923 | John | 33/544 |
| 1,796,129 | 3/1931 | Swanson | 33/544 X |
| 2,349,879 | 5/1944 | Ogren | 33/544 |
| 2,514,794 | 7/1950 | Prince | 33/544 |
| 2,662,296 | 12/1953 | Stedman | 33/544 |
| 2,855,686 | 10/1958 | Zelnick | 33/544 |
| 2,883,755 | 4/1959 | Lovenston | 33/502 |
| 3,417,475 | 12/1968 | Vlasaty | 33/502 |
| 3,566,500 | 3/1971 | Simon | 137/15 X |
| 4,919,510 | 4/1990 | Hoke et al. | 350/96.21 |

FOREIGN PATENT DOCUMENTS

| | | | |
|---|---|---|---|
| 2147176 | 3/1973 | Fed. Rep. of Germany | 33/544 |
| 3823684 | 5/1989 | Fed. Rep. of Germany | 33/502 |
| 2397620 | 3/1979 | France | 33/529 |
| 40109 | 3/1984 | Japan | 33/529 |
| 565105 | 7/1977 | U.S.S.R. | 73/1 J |

OTHER PUBLICATIONS

1 Page Photocopy rendition of Conventional X-Control Gage Produced by Dec. 1989, Gages Known by Nov. 1989.
D.O.D. Form 672-1 of Military Standard MS33514 entitled "Fitting End, Standard Dimensions For Flareless Tube Connection and Gasket Seal", 2 pages, date stamped Sep. 22, 1969.

Primary Examiner—Tom Noland
Attorney, Agent, or Firm—Cislo & Thomas

[57] ABSTRACT

An X-control gage for measuring the X-dimension of hydraulic tube fittings comprises a pin slidably engaged in a body part. In use, a lowermost end of the pin makes contact with the tube stop of the fitting port while the body part makes contact with the inner taper of the fitting along a circle having a specified "B"-diameter. An upper end of the pin extends beyond an upper end of the body part, and measurement of the distance of extension is simply related to the X-dimension of the fitting using a calibrated overall length of the pin and a calibrated dimension of the body part. Methods of calibrating and using the X-control gage are presented, as well as a method of connecting two hydraulic tubes so that there is no loss of hydraulic liquid or pressure at the connection.

21 Claims, 1 Drawing Sheet

GAGE AND METHOD FOR MEASURING THE X-DIMENSION OF HYDRAULIC TUBE FITTINGS

BACKGROUND OF THE INVENTION

This invention relates to measurement tools useful in the quality control of hydraulic tube fittings, and in particular to an X-control gage used in measuring the X-dimension of hydraulic tube fittings.

On Oct. 4, 1951 the original design drawings for flareless hydraulic tube fittings were issued by the United States Department of Defense under part numbers MS33514 and MS33515. The MS33514 drawing covers the standard flareless fitting end design whereas the MS33515 drawing covers the same fitting end design but has a central flange for use in mounting on a bulkhead, with one end of the fitting meant to protrude through a wall or other surface.

Both types of fittings are used to connect lengths of tubing together in aircraft to convey hydraulic fluids, fuels, and the like. The fittings are also used in land vehicles and other ground support equipment, both military and commercial. In addition, prime contractors to the government design their own special parts utilizing the MS33514 and MS33515 end design.

The government procurement specification used in buying fittings using the MS33514 and the MS33515 end design is MIL-F-18280. This procurement specification refers to MIL-STD-1655, which describes and classifies the various defects that may occur in manufacturing these parts and the effect that the defects might have on usability and safety. The defects are classified in order of importance as "major," "minor A," and "minor B." Major defects have a definite effect on safety and usability. Minor A defects could have an effect and minor B defects should have no effect.

Researching MS33514 and MS33515 in MIL-STD-1655 shows that both of these drawings have only one listed major defect, namely the "X" dimension. This "X" dimension can be defined as that distance from the theoretical sealing area on the 12-degree taper to the tube stop shoulder at the bottom of the port. If the "X" dimension is not within the appropriate tolerance, the parts can leak, causing a loss of hydraulic pressure with a subsequent loss of control functions depending upon that pressure. Obviously, if the "X" dimension is not correct the parts cannot and should not be accepted or used.

Historically, since 1951 when the drawings were originally issued, the only way to determine whether or not the "X" dimension was within tolerance was to use a so-called "X-control gage." These gages were manufactured by several source but they all utilized the same specific design. The design included a spring-loaded plunger inside a body with one end tapered and the other having a 0.010 step ground into the other end of the body.

Testing for part acceptance of a hydraulic fitting with these prior-art gages consisted of inserting the spring-loaded plunger into the port and resting it on the tube stop with the tapered end in contact with the internal taper in the fitting. Theoretically, if the opposite end of the plunger occupied a position anywhere between the upper and lower boundaries of the step created by the 0.010 slot, a part under test could be accepted.

This type of gage has defects which render it not only inaccurate but physically inappropriate for its intended function. The "B"-diameter shown on MS33514 and MS33515 is the theoretical diameter where the sealing function takes place during connection between a hose and the end of he fitting. This diameter must be accurate to within 0.0002 (plus or minus 0.0001). The way the taper on existing gages is formed, it is virtually impossible to determine where the "B"-diameter lies along the taper.

A full degree of tolerance (plus or minus 0.5 degree) on the sealing taper is allowed by MS33514 and MS33515. The tolerance exists to accommodate the tool grinders who manufacture the porting tools. It also allows for tool wear during production.

The only possibility for even moderately accurate use of an existing X-control gage is if the taper on the gage matches the taper on the tool exactly. If the tool taper is ground at the low-taper limit of 11 degrees 30 minutes and the gage taper is ground to 12 degrees 30 minutes, the gage will not work at all. If the tool taper is ground to the high-taper limit of 12 degrees 30 minutes and the gage taper is at the low-taper limit of 11 degrees 30 minutes, the "B"-diameter will never make contact on the taper.

The use of the 0.010-inch ground step at the back end of the gage only allows a visual "pass-fail" indication. Conventional X-control gages provide no way to determine actual numerical values of the quantity being measured. In the best case, using a properly calibrated, properly produced gage, one can effectively reject blatantly defective parts but in the process will also reject a quantity of acceptable parts manufactured to the outer limits. In the worst case, a gage which is improperly produced and calibrated will allow the acceptance of all defective parts. Without the provision of specific numerical readings it is impossible to uncover trends or differences in defects.

The manufacturers of conventional X-control gages have historically failed to provide specific calibration verification results to purchasers. This has occurred systematically due to the inherent flaws in the manufacture and application of these gages. The gages have been sold strictly through the use of "certificates of conformance" which state only that the gage meets the requirements of MS33514 and MS33515. Actual calibration results are never supplied because the results would show that the gage in fact does not meet the requirements.

Despite the defects and inadequacies of conventional X-control gages, they have been used without any substantial change in design for over 30 years. There has been a long-felt need for a gage that will yield actual numerical values that corroborate the accuracy of the "X" dimension and that can be calibrated easily and specifically for accuracy.

SUMMARY OF THE INVENTION

An X-control gage for hydraulic tube fittings having the desirable characteristics discussed above is provided in accordance with the invention.

It is an object of the present invention to provide an X-control gage for hydraulic fittings which includes a tapered end which is ground to a greater degree than the tolerance allowed by MS33514 and MS33515.

It is another object of the present invention to provide an X-control gage with a taper which never needs to contact the internal taper of the fitting to be tested, so that the angular tolerance issue is negated and the taper is used only for location.

It is yet another object of the present invention to provide an X-control gage with the actual "B"-diameter ground and lapped to size immediately behind and adjacent to the taper.

Another object of the present invention is to provide an X-control gage that has a specifically defined and immediately measurable "B"-diameter which, unlike existing gages, does not lie somewhere along the taper.

Still another object of the present invention is to provide an X-control gage for which, when the gage is inserted into a fitting to be tested, the "B"-diameter on the fitting taper is instantly recognizable by the "B"-diameter on the gage regardless of where the "B"-diameter lies on the fitting taper.

Yet another object of the invention is to provide an X-control gage with a pin sliding in a body part of the gage, and protruding an arbitrary distance beyond the gage body part during testing of the hydraulic fitting, so that a simple measurement of the distance from the body part of the gage to the end of the protruding pin can be made using simple vernier depth measuring devices to pass or reject the fitting.

It is one more object of the present invention to provide an X-control gage which actually measures the true X-dimension of a fitting.

Another object of the invention is to provide a method of calibrating an X-control gage with a pin slidably engaged in a body part having a tapered end and the "B"-diameter as the outer diameter of the body part immediately adjacent the beginning of the taper, by measuring the overall length of the sliding pin, by measuring the length from the intersection of the taper and the "B"-diameter on the gage body to the untapered end of the gage body, and verifying the "B"-diameter on the gage body.

Still another object of the invention is to provide a method of measuring the X-dimension of an MS33514 or MS33515 fitting port in which the tapered end of the gage is inserted into the port with finger pressure, a first end of a sliding pin is pushed into the port until it bottoms against the tube stop of the port, and a vernier depth micrometer or the like is used to obtain a measurement of the distance from the flat, untapered end of the gage body to a second, protruding end of the sliding pin.

Finally it is an object of the present invention to provide a method of assuring the connection of two or more hydraulic tubes, using a hydraulic fitting so that there is no loss of hydraulic liquid or pressure at the connection.

In accordance with the invention, methods and apparatus are presented for measuring the X-dimension of hydraulic tube fittings, and also a method for ensuring a connection between two hydraulic tubes without any loss of pressure or hydraulic fluid at the connection. An X-control gage is provided which comprises a generally cylindrical body part having an internal bore in which a pin is slidably engaged between first and second limits of its motion with respect to the body part.

The pin has flat, parallel upper and lower end faces which protrude beyond either end of the body part. The lower end face of the pin has a larger diameter than that portion of the pin which slides within the internal bore of the body part. The body part of the gage further comprises an annular flange near the bottom end of the body part.

The side of the sliding pin inside the body part has a transverse slot milled into it. A setscrew protrudes into the slot through a tapped hole in the curved surface of the body part. The sliding pin is constrained to move between positions in which the protruding setscrew interferes with the top and bottom walls of the transverse slot in the pin, preventing disassembly of the pin from the body during the gaging process.

The upper and lower ends of the body part are flat and parallel to each other and perpendicular to the longitudinal axis of the internal bore. Beginning at its lower end, the body part tapers outwardly to a diameter which is accurately ground and lapped to be the "B"-diameter of the fitting to be measured.

The degree of taper of the tapered portion of the body part is great enough so that when the gage is inserted into the port of a hydraulic fitting, the taper on the body part does not contact the internal taper of the fitting. Finger pressure applied to the flange portion of the body part ensures that the body part contacts the internal taper of the fitting along a contact circle having a diameter equal to the "B"-diameter.

A method of measuring the X-dimension of the port of a hydraulic fitting comprises allowing the lower end face of the sliding pin of the gage to rest against the tube stop inside the fitting while the body part is held against the internal taper of the fitting by finger pressure applied to the flange portion, and measuring the distance which the upper end of the pin protrudes beyond the upper end of the body part. A vernier type depth gage or some similar measuring tool can be used for this purpose.

The amount of pin protrusion is added to a calibrated dimension of the gage, namely the distance from the upper end of the body portion and extending to where the tapered portion ends in a adjacent straight cylindrical section having the "B"-diameter. The sum of these two distances is subtracted from the calibrated overall length of the sliding pin to yield the actual X-dimension of the fitting. The accuracy of the "B"-diameter of the portion of the body part adjacent the end of the taper will have been previously verified.

A method of ensuring a leak free connection between first and second hydraulic tube components comprises choosing appropriate male hydraulic fittings for the tubes on the basis of the type and size of the tubes, choosing a fitting having first and second female portions on opposite ends thereof, measuring the X-dimensions of the female portions of the fitting to determine whether they are within acceptable limits, and connecting the two tubes together by securing the male fittings to the female fitting if the female fitting has passed the X-dimension test. The resulting connection between the two hydraulic tubes forms a nonleaking joint which allows the transmission of hydraulic fluid from the first tube to the second tube without any loss of hydraulic pressure or liquid.

DESCRIPTION OF THE PREFERRED EMBODIMENTS

Figure 1:
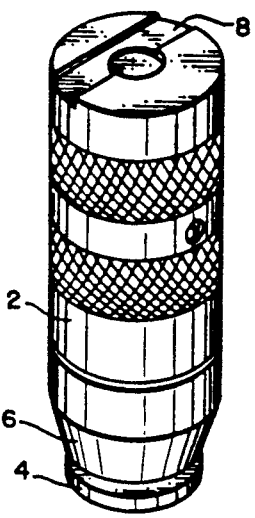
FIG. 1 is a perspective view of a prior-art X-control gage.
Figure 2:
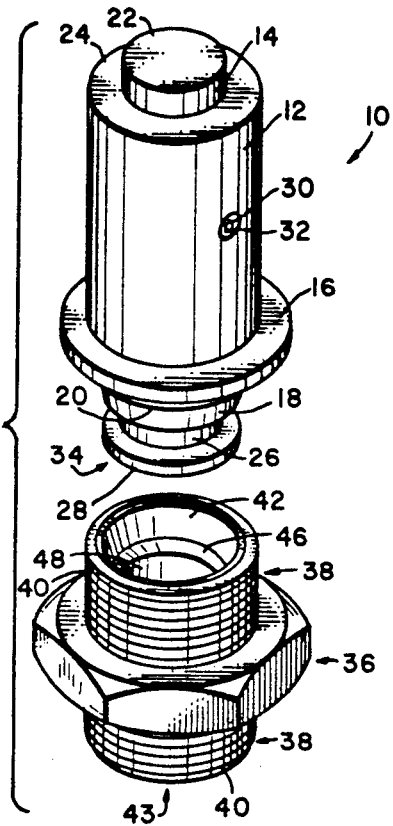
FIG. 2 is a perspective view of the X-control gage of the present invention and a hydraulic tube fitting into which the bottom end of the gage is to be inserted.
Figure 3:
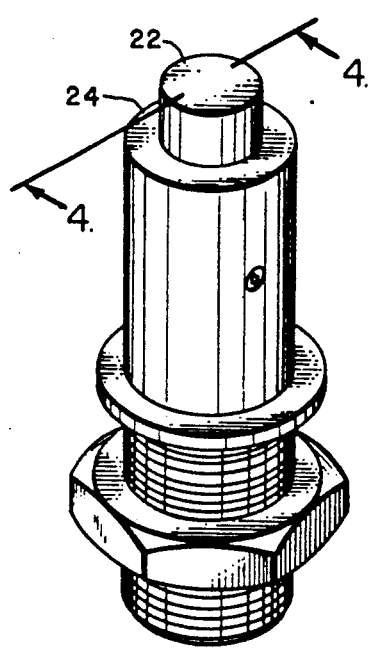
FIG. 3 is a perspective view of the X-control gage of the invention after insertion into the hydraulic tube fitting shown in FIG. 2.
Figure 4:
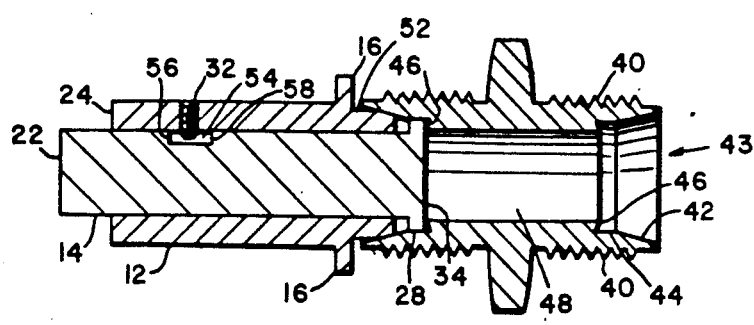

Referring to the figures of drawings wherein like reference numerals designate like elements throughout, FIG. 1 depicts a prior-art X-control gage and FIGS. 2-4 depict a preferred embodiment of the X-control gage of the present invention. For ease of illustration and description, the drawings illustrate only the pertinent features of the present invention and do not show the remaining conventional features.

Referring to FIG. 1, a prior-art X-control gage suffering from all the deficiencies described in the BACKGROUND section above consists of a body part 2 housing a spring loaded plunger 4 which protrudes from a tapered part 6 at the lower end of body part 2. A 0.010-inch slot 8 is machined into the top face of body part 2 to give a visual pass-fail indication depending on whether the upper end of plunger 4 lies within slot 8 when the lower end of the prior-art X-control gage is inserted into a hydraulic tube fitting. In use, tapered portion 6 makes theoretical contact with the inner taper of a hydraulic fitting being tested.

Referring to FIG. 2, the preferred embodiment of the X-control gage 10 of the present invention comprises a generally cylindrical body part 12 having an internal bore in which a pin 14 is slidably engaged to move within predetermined limits. Body part 12 has a flange portion 16 near its lower end. A tapered portion 18 adjacent the lower end of body part 12 has an upper boundary 20 with a diameter equal to the "B"-diameter of the part to be tested.

Pin 14 has a flat circular upper end face 22 which protrudes beyond a flat annular end surface 24 of body part 12. The lower portion 26 of pin 14 ends in a disk-shaped part 28 having a larger diameter than the upper remainder of pin 14.

A setscrew 30 in a tapped hole 32 through the side wall of body part 12 protrudes internally into a transverse slot milled into the curved surface of pin 14 (shown in the sectional view of FIG. 4). The protruding internal end of setscrew 30 prevents pin 14 from being separated from body part 12 of X-control gage 10, and limits the sliding motion of pin 14 inside body part 12 by butting up against the sides of the transverse slot cut in pin 14. A lower end face 34 of end part 28 of pin 14 is flat and parallel to upper end face 22 of pin 14.

Referring still to FIG. 2, hydraulic fitting 36 into which gage 10 is to be inserted comprises substantially identical female connector parts 38 on opposite ends. Either connector part 38 comprises an external threaded portion 40 and a port 43 to accommodate insertion of a male connector part secured to the end of a hydraulic tube.

Port 43 includes an inner taper 42 terminating in a short straight segment 44 of constant inner diameter. Segment 44 terminates proximally in a tube stop 46 of frustoconical shape with an annular projected area. A central portion 48 of the interior of fitting 36 has a constant inner diameter smaller than the outer diameter of tube stop 46.

Hydraulic fitting 36 as shown in FIG. 2 is an example of a union having a hex wrench configuration 50 utilized for connecting tubes or hose assemblies to each end. Other fittings obviously include but are not limited to tees, elbows, crosses, and unions.

In use, the lower end of X-control gage 10 is inserted into port 43 of fitting 36, as shown in FIG. 3. Finger pressure is applied to the annular upper surface of flange portion 16 of body part 12 while both gage 10 and fitting 36 are held in a vertical position with gage 10 above fitting 36.

Pin 14, which is free to slide in the inner bore of body part 12 of gage 10, moves under the action of gravity until end face 34 of pin 14 is in contact with tube stop 46 along its smallest circumference. Body part 12 makes contact with inner taper 42 of fitting 36 along a locus of points defined by circle 20. Since the circle 20 has a diameter equal to the "B"-diameter, body part 12 automatically contacts taper 42 at a location where port 43 has an inner diameter equal to the "B" diameter.

Before an X-control gage 10 is put into use, it is calibrated. The calibration consists of accurately measuring a dimension D equal to the perpendicular distance between upper end surface 24 of body part 12 and a plane containing the points of intersection of tapered portion 18 with the adjacent cylindrical segment of body part 12 having an outer diameter equal to the "B"-diameter. A second calibration measurement consists of determining the overall length L of pin 14. In FIG. 3, end face 22 of pin 14 protrudes upward beyond end surface 24 of body part 12. Let the distance of protrusion be designated as d.

Measuring the X-dimension of a hydraulic fitting 36 as shown in FIG. 3 comprises measuring d, adding the calibrated dimension D of body part 12, and subtracting the total from the calibrated overall length L of pin 16. As expressed in the form of an equation, $$L - (d + D) = X \tag{1}$$

Referring to FIG. 4, additional internal details of the relationship between gage 10 and fitting 36 can be seen. For example, tapered portion of body part 12 has a larger angle of taper than inner taper 42 in port 43 of hydraulic fitting 36. This ensures that contact between body part 12 of gage 10 and inner taper 42 takes place on circle 20, which has a diameter equal to the "B"-diameter. The perpendicular distance between the plane containing circle 20 and a plane containing end face 22 is equal to the X-dimension, since the X-dimension is defined as the distance between the most distal portion of tube stop 46 and a transverse plane through inner taper 42 having a diameter equal to the "B"-diameter, and end face 22 abuts the most distal portion of tube stop 46 when gage 10 is being used properly.

One special limiting case worth mentioning occurs when the inner taper 42 of fitting 36 happens to have the maximum allowable value of 12 degrees 30 minutes and the particular X-control gage 10 being used to measure the X-dimension of the fitting has this same value. In this limiting case, contact will be made between all points of tapered portion 18 of body part 12 of gage 10 and inner taper 42 of hydraulic fitting 36. In all other cases, there will be a single circle of contact points rather than the frustoconical annular area of contact peculiar to this special limiting case. For any value of the angle of taper of inner taper 42 smaller than 12 degrees 30 minutes, the surface of tapered portion 18 makes no contact at all with the surface of inner taper 42 in port 43 of fitting 36.

Body part 12 and pin 14 of gage 10 are preferably made of a heat treated tool steel, although any suitable noncorroding metal or machinable hard plastic could also be used. The various dimensions of X-control gage 10 will depend of course on the particular size number of the hydraulic fitting on which the gage is to be used.

For example, the outer diameter of straight segment portion 52 of body art 12 will vary between approximately 0.1630 inch for a size number 2 fitting and 2.0680 inches for a size number 32 hydraulic fitting. Similarly, the distance between the lower surface of flange portion 16 and the lower end of body part 12 will vary from approximately 0.178 inch for a size number 2 hydraulic fitting and 0.495 inch for a size 32 hydraulic fitting.

The surface of straight segment portion 52 of body part 12 is preferably ground and lapped to its final diameter. The inner diameter of the inner bore of body part 12 is preferably concentric with "B"-diameter segment 52 to within 0.0005 TIR. The value of the angle of taper of tapered portion 18 of body part 12 is preferably in the range between 12 degrees 30 minutes and 13 degrees.

The diameter of the lower end 28 of pin 14 will typically range from about 0.125 inch for a size number 2 fitting to 2.000 inch for a size number 32 fitting. The overall length of pin 14 will typically be between about 1.500 inches for a size number 2 fitting and 2.000 inches for a size number 32 fitting.

Referring to FIG. 4, the center of transverse slot 54 in pin 14 can be about 0.625 inch from end face 22 of pin 14. Slot 54 can be about 0.250 inch wide and 0.050 inch deep. As can be appreciated from FIG. 4, the range of motion of pin 16 with respect to body part 12 is limited by a first position in which setscrew 30 abuts side wall 56 of slot 54 and a second position in which setscrew 30 abuts side wall 58 of slot 54.

A method of joining two hydraulic tubes, each having a free end, so that there is no loss of hydraulic liquid or pressure at the joint, comprises the following steps:

(1) choosing a first male hydraulic fitting for one of the tubes on the basis of the type and size of the tube;

(2) choosing a second male fitting for the other tube on the basis of the type and size of the tube;

(3) choosing a double-ended female fitting housing ports 43 appropriate for the two male fitting (4) inserting a first end of slidable pin 14 moving in body part 12 of gage 10 into each port 43 of the fitting 36 until it bottoms on the tube stop 46 in port 43;

(5) measuring a first distance pin 14 extends beyond upper end surface 24 of body part 12 of gage 10;

(6) adding the first distance to a calibrated dimension of body part 12 which is the distance from the lower end of body part 12 to the intersection of the tapered, second end of body part 12 with adjacent segment 52 having a diameter equal to the B-diameter;

(7) subtracting the sum of the first distance and the calibrated dimension from a calibrated overall length of pin 14 to produce an X-dimension measurement;

(8) proceeding to step (9) if the measurement determined by steps (4) through (7) is within a predetermined range of values, otherwise going back to step (3);

(9) attaching the first male hydraulic fitting to the free end of the first tube;

(10) attaching the second male hydraulic fitting to the free end of the second tube; and

(11) connecting the first and second male fittings to the female fitting.

The result of carrying out the above steps is a nonleaking joint between the tubes which allows the transmission of hydraulic liquid from the first tube to the second tube without loss of hydraulic pressure or liquid.

Figure 5:
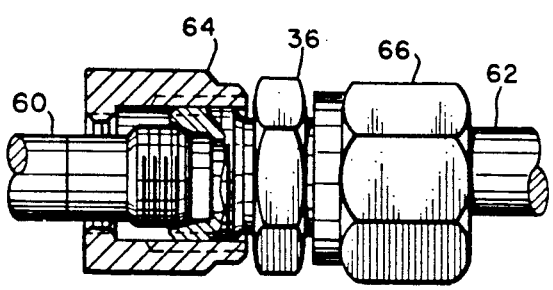
FIG. 4 is a sectional view along the line indicated in FIG. 3 of the X-control gage inserted into the hydraulic tube fitting and FIG. 5 is a side elevational view, partly in section, of a nonleaking joint between hydraulic tubes using the method of the present invention.

FIG. 5 depicts such a nonleaking joint between hydraulic tubes 60 and 62, each having a male fitting 64 and 66, respectively, at the end thereof. Male fittings 64 and 66 have been inserted into ports 43 of female fitting 36 and attached thereto by screwing onto threaded portions 40 of fitting 36.

It should be understood that the invention in its broader aspects is not limited to the specific embodiments shown and described herein, but departures may be made therefrom within the scope of the appended claims without departing from the principles of the invention and without sacrificing its chief advantages. For example, the invention has applicability to hydraulic components including but not limited to tees, elbows, crosses, unions, and straight tubes using the MS33514 and MS33515 design end and the setscrew-slot arrangement for limiting the motion of pin 14 inside body part 12 could be replaced by a spring-loaded ball moving in an internal groove. All such modifications and changes will make themselves apparent to those of ordinary skill in the art and all such changes and modifications are intended to be covered by the appended claims.

What is claimed is:

1. A gage for facilitating measurement of an X-dimension of a hydraulic tube fitting having a port with an inwardly tapered portion narrowing to a cylindrical portion ending in a tube stop of smaller inner diameter than said cylindrical portion, comprising:

locating means for locating said gage in a position on said inner taper of said port at which the diameter of said inner taper is equal to a specified "B"-diameter when a lower end of said gage is inserted into said port of said fitting;

abutting means for abutting a centrally slidable member projecting from said locating means and having a flat lower end face up against said tube stop in said port of said fitting; and indicating means rigidly connected to said abutting means for indicating a distance of travel of said lower end face of said slidable projection from a first position closest said locating means to a second position wherein said lower end face of said projection is in contact with said tube stop in said port of said fitting;

wherein the position of said indicating means with respect to said locating means can be measured and used in conjunction with calibrated dimensions of said gage to accurately determine said X-dimension.

2. The gage of claim 1 wherein said locating means has an internal bore therethrough and has a lower end portion which includes a cylindrical segment having a diameter equal to the "B"-diameter.

3. The gage of claim 2 wherein said lower end portion of said locating means further includes a frustoconical tapered portion adjacent said cylindrical segment and tapering inwardly and distally therefrom to end in a flat lower end surface.

4. The gage of claim 3 wherein an angle of taper of said tapered portion of said location means is greater than a maximum allowable angle of taper of said inwardly tapered portion of said fitting.

5. The gage of claim 2 wherein said abutting means comprises a cylindrical pin having a lower end face which is flat and of sufficient maximum dimension to be stopped by said tube stop when inserted into said port of said fitting, said pin being slidably engaged in said internal bore of said locating means.

6. The gage of claim 5 wherein said indicating means has a flat upper end face which is displaced a distance d above a flat, parallel upper end surface of said locating means when said lower end face of said abutting means is in contact with said tube stop of said fitting, said distance d being simply related to the X-dimension of said fitting.

7. The gage of claim 2 wherein said locating means further comprises pressure means for applying contact pressure to said fitting when said gage is inserted into said port of said fitting.

8. The gage of claim 7 wherein said pressure means comprises a plurality of projecting portions on said locating means near said lower end of said locating means.

9. The gage of claim 2 further comprising means for limiting the movement of said abutting means with respect to said locating means and for preventing complete separation of said locating means and said abutting means.

10. A method of calibrating the X-control gage of claim 1, comprising:
    a) measuring an overall length of said abutting means and said indicating means, from an uppermost end of said indicating means to a lowermost end of said abutting means;
    b) measuring a perpendicular distance from said locating means to a lowermost portion of said locating means having a diameter equal to the specified "B"-diameter; and
    c) verifying that said "B"-diameter is within predetermined limits.

11. A method of measuring the X-dimension of the hydraulic tube fitting having the port with the inwardly tapered portion narrowing to the cylindrical portion ending in the tube stop of smaller inner diameter than said cylindrical portion using the X-control gage as described in claim 1, said gage being characterized by a calibrated overall length which is the distance between an uppermost end of said indicating means to a lowermost end of said abutting means and a calibrated dimension which is the perpendicular distance from an uppermost end of said locating means to a lowermost part of a portion of said locating means having said "B"-diameter, comprising:
    a) inserting a lowermost end of said locating means into said port of said fitting so that the lowermost end of said abutting means comes into contact with said tube stop in said port of said fitting and said locating means contacts said inwardly tapered portion of said fitting along a circle having the "B"-diameter;
    b) measuring a first distance said uppermost end of said indicating means extends beyond said uppermost end of said locating means;
    c) adding said first distance to said calibrated dimension of said gage to produce a sum of said distance and said dimension; and
    d) subtracting said sum from said calibrated overall length to produce the X-dimension measurement.

12. A method of joining hydraulic components having at least first and second hydraulic tubes having first and second free ends, respectively, so that there is no loss of hydraulic liquid or pressure at the joint using an X-control gage as described in claim 1, said gage being characterized by a calibrated overall length which is the distance between an uppermost end of said indicating means to a lowermost end of said abutting means and a calibrated dimension which is the perpendicular distance from an uppermost end of said locating means to a lowermost part of a portion of a locating means having said "B"-diameter, comprising:
    a) choosing a first male hydraulic fitting for said first tube on the basis of the type and size thereof;
    b) choosing a second male fitting for said second tube on the basis of the type and size thereof;
    c) choosing a double-ended female fitting appropriate for said male fittings;
    d) inserting a lowermost end of said locating means into said port of said fitting so that the lowermost end of said abutting means comes into contact with said tube stop in said port of said fitting and said locating means contacts said inwardly tapered portion of said fitting along a circle having the "B"-diameter;
    e) measuring a first distance said uppermost end of said indicating means extends beyond said uppermost end of said locating means;
    f) adding said first distance to said calibrated dimension of said gage to produce a sum of said distance and said dimension;
    g) subtracting said sum from said calibrated overall length to produce an X-dimension measurement;
    h) proceeding to step i) if said measurement determined by steps d) through g) is within a predetermined range of acceptable values, otherwise going back to step c);
    i) attaching said first male hydraulic fitting to said first free end of said first tube;
    j) attaching said second male hydraulic fitting to said second free end of said second tube; and
    k) connecting said first and second male fittings to said female fitting, thereby forming a nonleaking joint which allows the transmission of hydraulic liquid from said first tube to said second tube without loss of hydraulic pressure or liquid.

13. A method of calibrating the X-control gage of claim 1, wherein said gage has a pin slidably engaged in a body part between upper and lower limits of movement, said body part having upper and lower opposite end surfaces, said lower end surface being adjacent to a tapered portion tapering outwardly and proximally to an accurately ground and lapped segment of a predetermined B-diameter; and said pin having upper and lower end faces, said lower end face being nearest said lower end surface of said body part, with a larger diameter than an inner diameter of a tube stop portion of said fitting port, comprising the steps of:
    a) measuring an overall length of said pin between said upper and lower end faces;
    b) measuring a perpendicular distance from said upper end surface of said body part to an intersection of said tapered portion of said body part with said accurately ground and lapped segment of said predetermined B-diameter; and
    c) verifying that said "B"-diameter is within predetermined limits.

14. A method of measuring with the X-control gage of claim 1 the X-dimension of the hydraulic tube fitting having a port with an inwardly tapered portion narrowing to a cylindrical portion ending in a tube stop of smaller inner diameter than said cylindrical portion, comprising:

a) inserting a lower end of a slidable pin moving in a body part of said gage into the port of said fitting until it bottoms on said tube stop in said port, said gage being characterized by a calibrated dimension which is the distance from an upper end of said body part to the intersection of a tapered, lower end of said body part with a proximally adjacent segment having a diameter equal to a predetermined B-diameter;

b) measuring a first distance said pin extends beyond said upper end of said body part of said gage;

c) adding said first distance to said calibrated dimension to produce a sum of said distance and said dimension; and d) subtracting said sum from a calibrated overall length of said pin to produce an X-dimension measurement.

15. A method of joining first and second hydraulic tubes having first and second free ends, respectively, so that there is no loss of hydraulic liquid or pressure at the joint, making use of the X-control gage of claim 1, comprising:

a) choosing a first male hydraulic fitting for said first tube on the basis of the type and size thereof;

b) choosing a second male fitting for said second tube on the basis of the type and size thereof;

c) choosing a double-ended female fitting having two ports appropriate for said male fittings;

d) inserting a first end of a slidable pin moving in a body part of said gage into each port of said fitting until it bottoms on said tube stop in said port, said gage being characterized by a calibrated dimension which is the distance from an upper end of said body part to the intersection of a tapered, lower end of said body part with a proximally adjacent segment having a diameter equal to the B-diameter;

e) measuring a first distance said pin extends beyond said upper end of said body part of said gage;

f) adding said first distance to said calibrated dimension to produce a sum of said distance and said dimension;

g) subtracting said sum from a calibrated overall length of said pin to produce an X-dimension measurement;

h) proceeding to step i) if said measurement determined by steps d) through g) is within a predetermined range of acceptable values, otherwise going back to step c);

i) attaching said first male hydraulic fitting to said first free end of said first tube;

j) attaching said second male hydraulic fitting to said second free end of said second tube; and k) connecting said first and second male fittings to said female fitting, thereby forming a nonleaking joint which allows the transmission of hydraulic liquid from said first tube to said second tube without loss of hydraulic pressure or liquid.

16. A gage for facilitating measurement of the X-dimension of a hydraulic tube fitting having a port with an inwardly tapered portion narrowing to a cylindrical portion ending in a tube stop of smaller inner diameter than said cylindrical portion, comprising:

a body part with flat, parallel upper and lower end surfaces, having an internal bore therethrough and further having an external tapered shoulder portion tapering down toward said lower end surface from a predetermined external B-diameter portion of said body part adjacent said shoulder;

a pin having flat, parallel upper and lower end faces, slidably engaged in said internal bore of said body part and extending beyond said upper and lower end surfaces of said body part, constrained to move along a line perpendicular to said end surfaces and end faces between a first limiting position defined by a predetermined maximum distance between said lower end surface of said body part and said lower end face of said pin, and a second limiting position defined by a predetermined minimum distance between said lower end surface of said body member and said lower end face of said pin; and means for constraining the motion of said pin between said first and second limits and for preventing separation of said pin from said body part.

17. The gage of claim 16 wherein said bore and said pin are generally cylindrical and of mating dimensions.

18. The gage of claim 16 wherein said pin further comprises a cylindrical lower end portion of larger diameter than the remainder said pin.

19. The gage of claim 16 further comprising a flange portion of said body part, extending therefrom at a sufficient distance from said lower end face that said body part at the intersection of said shoulder portion and said B-diameter portion contacts said inwardly tapered portion of said port of said fitting when said gage is inserted into said fitting.

20. The gage of claim 19 wherein said flange portion comprises an annular projection from said body part of sufficient incremental radius that at least part of one finger of a user or said gage may be applied thereto on either side of said body part in making measurements with said gage.

21. The gage of claim 16 wherein said pin has a slot with first and second side walls perpendicular to a direction of sliding motion of said pin in a portion thereof normally inside said body part, and said body part has a tapped hole therethrough which communicates with said slot, and further comprising a setscrew in said tapped hole extending into said slot, wherein said setscrew butts up against first and second side walls of said slot when said first and second limits of motion of said pin are reached.

* * * * *